United States Patent [19]

Pirani et al.

[11] Patent Number: 4,571,732
[45] Date of Patent: Feb. 18, 1986

[54] ADAPTIVE EQUALIZER FOR BINARY SIGNALS AND METHOD OF OPERATING SAME

[75] Inventors: Giancarlo Pirani; Valerio Zingarelli, both of Turin, Italy

[73] Assignee: CSELT Centro Studi e Laboratori Telecomunicazioni S.p.A., Turin, Italy

[21] Appl. No.: 601,983

[22] Filed: Apr. 19, 1984

[30] Foreign Application Priority Data

Apr. 19, 1983 [IT] Italy .................... 67424 A/83

[51] Int. Cl.⁴ .................. H04B 3/06; G06F 15/31
[52] U.S. Cl. ........................... 375/12; 364/723; 364/724; 375/14
[58] Field of Search ............ 364/723, 724, 734; 375/11, 12, 14, 16; 333/18

[56] References Cited

U.S. PATENT DOCUMENTS

| | | | |
|---|---|---|---|
| 4,243,924 | 1/1981 | Onoda et al. | 364/723 |
| 4,394,768 | 7/1983 | Sari | 375/14 |
| 4,468,786 | 8/1984 | Davis | 364/724 |
| 4,489,391 | 12/1984 | Morikawa | 364/724 |

OTHER PUBLICATIONS

S. Takenaka et al. "A Transversal Fading Equalizer for a 16-QAM Microwave Digital Radio" 1981 IEEE, pp. 46.2.1-46.2.5, Japan.
C. L. Chao et al. "A Comparative Performance Evaluation of Slope Equalizers and Decision Directed Weight Control Equalizers" 1982 IEEE, pp. 1233-1239, California.
Y. L. Kuo et al. "A Baseband Adaptive Equalizer for a 16-State QAM Digital System Over Mastergroup Band Analog Network", 1982 IEEE, pp. 1246-1250.
G. Pirani et al. "Multiplication-Free Filters for Subband Coding of Speech", vol. X-No. 5, Oct. 1982, pp. 389-393, Italy.
G. Pirani et al. "Multiplication-Free Equalizer for Multipath Fading Channels", vol. X-No. 4, Aug. 1982, pp. 243-248, Italy.

*Primary Examiner*—Benedict V. Safourek
*Attorney, Agent, or Firm*—Karl F. Ross; Herbert Dubno

[57] ABSTRACT

An adaptive equalizer for high-speed binary signals, operating in baseband, comprises a transversal filter receiving digitized samples of incoming symbols and feeding them to a decision stage. The samples also go to a coefficient computer, in parallel with that filter, which includes a filter simulator, an error calculator and a processor delivering corrective coefficients to the filter. A register in the filter simulator accumulates a predetermined multiplicity of received samples (e.g. 150) which are jointly convoluted with an initial set of coefficients to yield a mean square error supplied by the error calculator to the processor; the latter, for each coefficient of the initial set, selects two collateral values which are successively substituted for that coefficient to yield two further mean square errors. Using an algorithm based upon a parabolic function, the processor computes an optimized coefficient which is rounded to the nearest power of 2 constituting a new coefficient replacing the corresponding coefficient of the initial set. After all coefficients of the initial set have been thus replaced to produce an updated set, the processor determines whether the resulting mean square error is less than that obtained with the initial set and, if so, substitutes the updated set for the initial set in the transversal filter.

4 Claims, 4 Drawing Figures

ADAPTIVE EQUALIZER FOR BINARY SIGNALS AND METHOD OF OPERATING SAME

FIELD OF THE INVENTION

Our present invention relates to an adaptive equalizer for the reception of binary signals, especially at high speed and by way of microwave radio links, and to a method of operating same.

BACKGROUND OF THE INVENTION

The propagation of electromagnetic waves through the atmosphere is highly dependent on the refractive index of the surrounding medium. That index is subject to random variations, being determined by altitude and meteorological conditions. These conditions tend to give rise to so-called atmospheric conduits into which the electromagnetic waves are channeled but which do not remain fixed for any length of time. In some instances, furthermore, part of the signals sent out by a transmitting antenna arrive at a receiving antenna over several paths, namely as a direct ray and as one or more rays reflected by intervening objects. The sum of the signal components traveling over these diverse paths is degraded by phase and amplitude distortions which can be considered due to alterations of the transfer function of the transmission channel involved. The degradations are intensified with increasing transmission rates and complexity of the adopted modulation technique.

Equalizers designed to minimize these distortions can be subdivided into two major groups respectively operating with intermediate-frequency and baseband compensation.

The techniques of intermediate-frequency equalization are generally simpler, both conceptually and technologically, than those relating to baseband equalization; this particularly applies to high-speed transmission. However, i-f equalization does not always assure good compensation, as where the actual distortions deviate significantly from the expected channel distortions for which the equalizer is designed, where significant differences in delay occur among several paths over which respective signal components are received, or in the case of selective fadings produced when the signal component of highest amplitude is not the one undergoing the least propagation delay.

Baseband-equalization techniques, on the other hand, are not subject to those drawbacks. These techniques do not require any precalculation of the characteristics of a given channel model and operate efficiently under the various conditions referred to above.

The most sophisticated methods of this nature (estimate of maximum likelihood of received sequences, or Kalman filtering) are very complex to implement and have therefore been applied up to now mainly in modems for data transmission over telephone lines.

With high-speed transmission over binary radio links, currently employing rates of 140 to 200 Mbit/sec, technological problems leave only two practical choices for baseband equalization, namely filtering with feedback from a decision stage or correction of the coefficients of a transversal filter preceding that stage.

Filtering with decision feedback involves not only structural complexity but also a possibility of error propagation. Thus, the symbols issuing from the decision stage are used for canceling the intersymbol interference due to so-called postcursors so that, if a decision is wrong, the intersymbol interference is doubled and the probability of error in the ensuing sequence is increased.

For the equalization of transversal filters in radio-link transmission, various systems using analog devices have been described in the literature. See, for example:

An article by S. Takenaka et al titled "A Transversal Fading Equalizer for a 16-QAM Microwave Digital Radio", published June 14–18, 1981, IEEE International Conference on Communications, Denver, Colo., pages 46.2.1–46.2.5;

an article by Y. L. Kuo et al titled "A Baseband Adaptive Equalizer for a 16-State QAM Digital System Over Mastergroup Band Analog Networks", published Nov. 29–Dec. 2, 1982, IEEE Globecom Conference, Miami, Fla., pages F.3.6.1–F.3.6.5;

an article by C. L. Chao et al titled "A Comparative Performance Evaluation of Slope Equalizers and Decision-Directed Weight Control Equalizers", same publication, pages F3.4.1–F3.4.7.

The presence of analog multipliers, which are difficult to adjust and of considerable complexity in the case of high transmission rates, makes these systems expensive and prone to malfunction.

Even upon a changeover from analog to digital devices, the need for such multipliers prevents a significant reduction in complexity and cost with high-speed transmission. The elimination of multipliers, in systems pertaining to phase-shift keying (PSK) and to speech transmission, has been described by us in a paper titled "Multiplication-free Equalizers for Multipath Fading Channels", published June 13–18, 1982, IEEE International Conference on Communications, Philadelphia, Pa., pages 4B.3.1–4B.3.5, and in another paper written jointly with F. Rusinà, titled "Multiplication-free Filters for Subband Coding of Speech", published May 10–14, 1982, IEEE International Symposium on Circuits and Systems. Those systems, however, lack the capacity of adapting themselves to time-varying distortions typical of radio channels and are therefore unsuitable for the type of equalizer here considered.

OBJECTS OF THE INVENTION

An object of our present invention, therefore, is to provide a method of so operating a baseband equalizer for high-rate radio reception of binary signals as to obviate the need for multipliers and decision feedback, on the one hand, and automatically compensate time-variable distortions with an adaptation speed sufficient for the transmission requirements of terrestrial microwave radio links.

A related object is to provide means in such an equalizer for carrying out that method.

SUMMARY OF THE INVENTION

The method of operating a baseband equalizer according to our invention involves real-time computation of equalizer coefficients by the use of an optimization algorithm. The equalizer includes, in common with usual practice, a transversal filter inserted between an analog/digital converter and a decision stage, the converter extracting digitized samples from respective symbols of the incoming signal flow. In a first method step, the transversal filter is loaded with an initial set of corrective coefficients represented by powers of 2; the exponents of these powers may be both positive and negative. We then accumulate, in a second step, a predetermined multiplicity or block of consecutively extracted samples in a register. Next, this multiplicity of samples are convoluted with the initial set of coefficients and an original mean square error is calculated from the result. A first coefficient of the initial set, which could be chosen at random but preferably is selected in an orderly manner, is then successively replaced in that set with two collateral values respectively differing therefrom, subtractively and additively, by predetermined magnitudes. The convolution and error calculation are then separately repeated with each of these collateral values included in the initial set whereby two further mean square errors respectively correlated with these values are obtained. When the first coefficient and its collateral values are taken as abscissae in a two-dimensional coordinate system and the mean square errors respectively associated therewith are used as ordinates, we obtain the locations of three points uniquely defining a parabola. In a further step, the abscissa of the vertex of that parabola is determined as an optimized coefficient which is then rounded to the nearest power of 2, the latter constituting a new coefficient that is substituted in the initial set for the first coefficient with all other coefficients remaining unchanged. The preceding steps of convolution and error calculation are now repeated with the set so modified and with two collateral values on opposite sides of a selected second coefficient, and so forth until all the coefficients of the initial set have been replaced by new coefficients forming an updated set. When the mean square error derived from the updated set is found to be less than the original error obtained from the initial set, the latter is replaced in the transversal filter by that updated set. The entire procedure is then reiterated with a new block of samples.

With $c_i$ representing a given coefficient, $c_i'$ representing the subtractively obtained collateral value and $c_i''$ being the additively obtained collateral value, and with $\epsilon_i$, $\epsilon_i'$ and $\epsilon_i''$ denoting the errors respectively calculated for sets containing these three values $c_i$, $c_i'$, $c_i''$, the optimized value $\overline{c_i}$ is given by the following equation:

$$\overline{c_i} = -\frac{1}{2} \cdot \frac{c_i'^2(\epsilon_i'' - \epsilon_i) - c_i''^2(\epsilon_i' - \epsilon_i)}{c_i'(\epsilon_i'' - \epsilon_i) + c_i''(\epsilon_i' - \epsilon_i)} \quad (1)$$

An equalizer according to our invention, designed to carry out the aforedescribed method, comprises besides the aforementioned transversal filter, inserted between an analog/digital converter and a decision stage, a coefficient computer connected to the converter output, in parallel with that filter. The computer includes a filter simulator which accumulates in a first register a predetermined multiplicity or block of digitized samples of consecutively incoming symbols and stores in a second register a set of coefficients elaborated in a processor also forming part of that computer. The incoming symbols are convoluted with the stored coefficients and the results are delivered to an error calculator which determines therefrom the mean square error inherent in the stored set. The processor, receiving the errors determined by that calculator, carries out the operation of equation (1) for each coefficient $c_i$ of the stored set in order to obtain therefrom the optimized sufficient $\overline{c_i}$ and round it up or down to the nearest power of 2 constituting a new coefficient. When all the coefficients of the initial set have been replaced in the second register by new coefficients constituting the updated set, and if the resulting mean square error is found to be less than that obtained from the initial set, the updated set is loaded into the transversal filter and is also retained in the second register of the filter simulator.

It should be noted that the replacement of calculated values by the nearest powers of 2, designed to enable the substitution of simple shift registers for the more conventional digital multipliers, has been described in our two published papers identified above.

Pursuant to a further feature of our invention, the transversal filter is essentially constituted by two groups of such shift registers, the first group acting as a delay line for the bits of a binary word coming from the analog/digital converter while the second group, in response to individual stepping commands received from the processor, displaces undelayed and differently delayed samples to positions conforming to the selected powers of 2. The samples so shifted are then combined in a binary adder to a multibit word supplied to the decision stage.

BRIEF DESCRIPTION OF THE DRAWING

The above and other features of our invention will now be described in detail with reference to the accompanying drawing in which.

SPECIFIC DESCRIPTION

Figure 1:
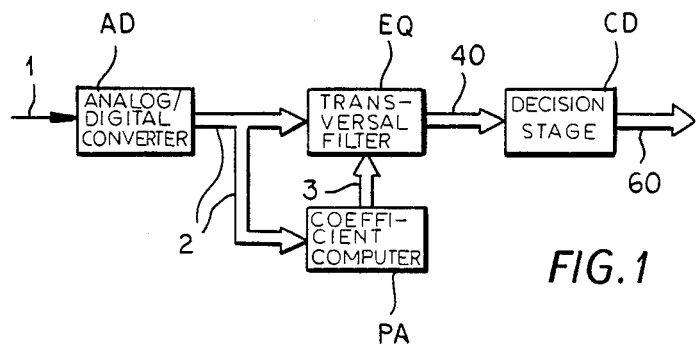
FIG. 1 is a block diagram of a receiver of binary signals equipped with our improved equalizer.

The signal receiver shown in FIG. 1, connected to the incoming end of a radio link 1, comprises an analog/digital converter AD which is timed by a nonillustrated clock, in the rhythm of the arriving symbols, to transform each symbol into a digitized sample of up to n bits. These bits are transmitted in parallel, via a bus 2, to a transversal filter EQ and to a coefficient computer PA; the latter has an output connection 3 extending to filter EQ. Stage CD emits decided symbols on a line 60.

From time to time, as explained in detail hereinafter, filter EQ receives a new set of coefficients from computer PA via connection 3. The structure of computer PA will be described in detail with reference to FIG. 3.

Figure 2:
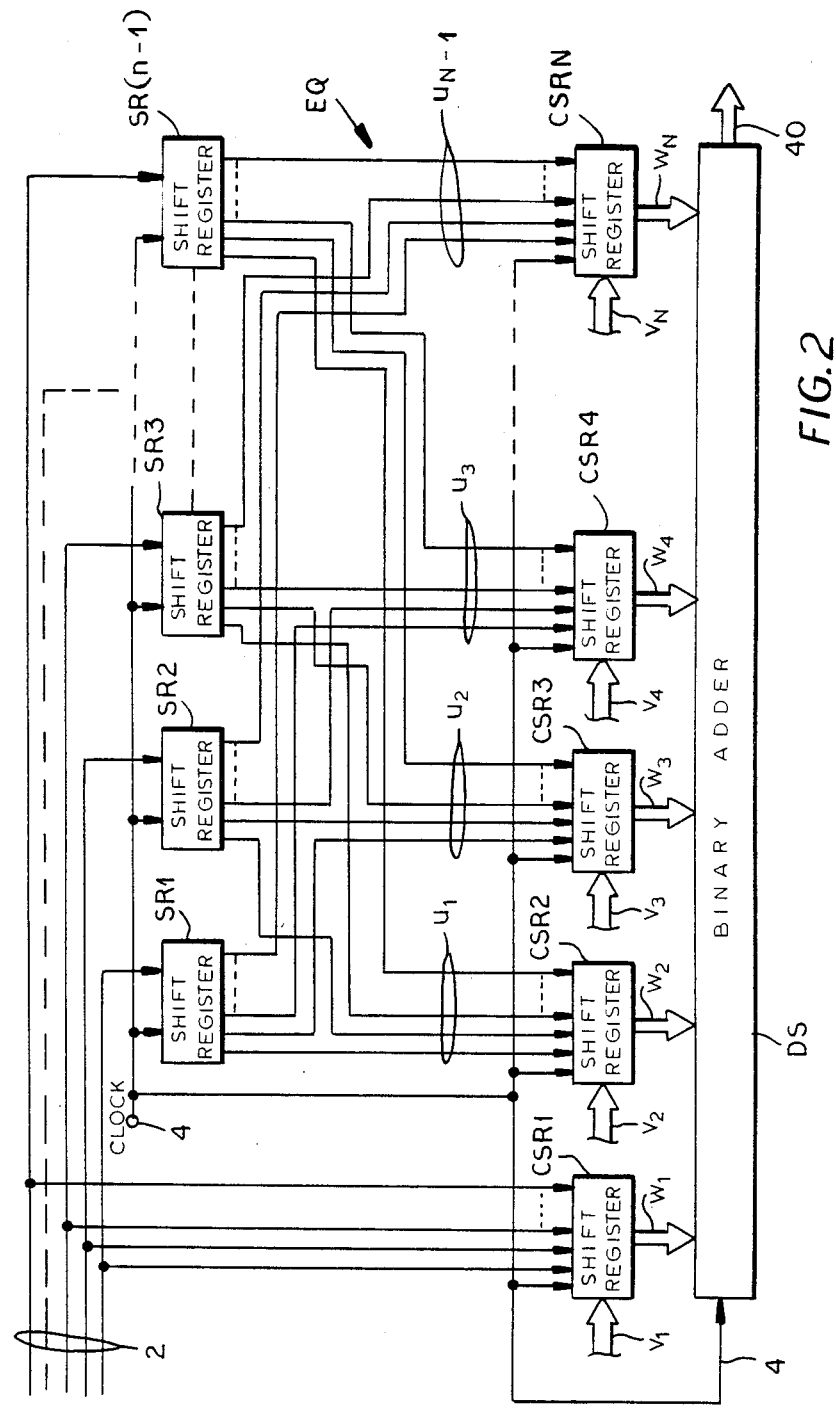
FIG. 2 shows details of a transversal filter forming part of the equalizer of FIG. 1.

FIG. 2 shows the organization of filter EQ comprising two groups of shift registers $SR_1$–$SR(n-1)$ and $CSR_1$–$CSRN$, with N representing the number of filter coefficients. The several bits of an incoming digitized sample, appearing on respective wires of bus 2, are fed to serial inputs of the respective registers $SR_1$–$SR(n-1)$ which are stepped under the control of clock pulses on a lead 4, in the rhythm of the incoming symbols, and have $(N-1)$ stages each. All the bits are also supplied in parallel to respective stages of the first shift register $CSR_1$ of the second group. All first stages of registers $SR_1$–$SR(n-1)$, having output leads collectively labeled $u_1$, are nondestructively read out in parallel to respective stages of register $CSR_2$ on the next clock cycle concurrently with the appearance of a new sample on bus 2. After a second clock pulse, the bits now shifted in registers $SR_1$–$SR(n-1)$ are similarly read out to register $CSR_3$, via leads collectively labeled $u_2$. Analogously, after the next shift, these bits appear on leads collectively labeled $u_3$ terminating at respective stages of register $CSR_4$. After a final shift, the bits have arrived at the last stages of registers SR1–SR(n−1) and are read out to respective stages of register CSRN by way of leads collectively designated $u_{N-1}$.

The contents of registers CSRN are shiftable under the control of respective stepping commands $v_1$–$v_N$, forming part of connection 3 (FIG. 1), and in their shifted positions are delivered by way of respective line multiples $w_1$–$w_N$ to a binary adder DS which generates the output signal on line 40. Adder DS is also controlled by the clock pulses on lead 4.

The number of steps taken by each shift register CSR1–CSRN corresponds to the magnitudes of the exponents of respective powers of 2, representing a set of N corrective coefficients to be loaded into filter EQ, and the direction of the shifts depends on the signs of these exponents. It will thus be apparent that the multibit word issuing from adder DS is the sum of a current sample and of the immediately preceding (N−1) samples, each multiplied by a respective filtering coefficient.

Figure 3:
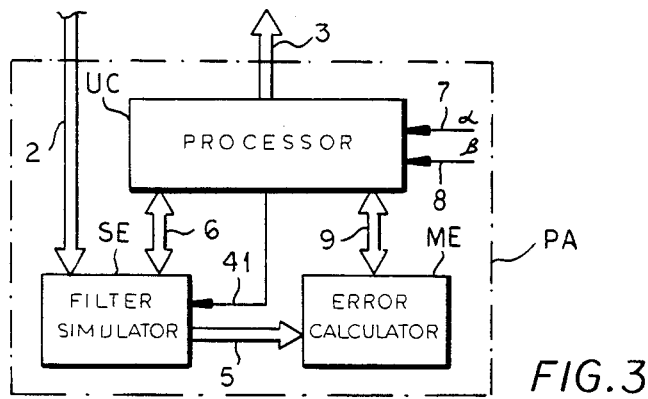
FIG. 3 shows details of a coefficient computer included in that equalizer.

In FIG. 3 we have shown the coefficient computer PA as comprising a transversal-filter simulator SE, an error calculator ME, and a processor UC controlling their operation via respective bidirectional buses 6 and 9. Filter simulator SE receives incoming samples from converter AD (FIG. 1) by way of bus 2 and transmits the result of its operations, described hereinafter with reference to FIG. 4, to error calculator ME via a connection 5. Calculator ME determines, from the output signals of simulator SE, a mean square error generally designated $\epsilon_i$ whose significance will be explained hereinafter. This error signal is delivered via bus 9 to processor UC which, using the algorithm according to equation (1), progressively modifies a set of coefficients stored in filter simulator SE to determine whether an initial set of corrective coefficients is to be replaced by an updated set in transversal filter EQ to which it is linked by output connection 3. The processor also has two input connections 7 and 8, carrying fixed magnitudes $\alpha$ and $\beta$, and an output lead 41 extending to simulator SE. A memory and a programmer inside the processor enable it to perform the necessary functions, including the aforedescribed rounding of optimized coefficients to the nearest powers of 2.

Let us now consider a mean square error $\epsilon(c)$ left uncorrected by filter EQ of FIG. 1 at an instant t when an incoming samples $a_t$ enters that filter and gives rise to an output signal $y_t$ from which decision stage CD derives a corrected symbol $\hat{a}_t$; c is the N-dimension vector of the corrective filter coefficients. Error $\epsilon(c)$ can be expressed by $$\epsilon(c) = E(y_t - a_t)^2 = c^{(T)} \cdot A \cdot c - 2\sigma^2 h^{(T)} c + \sigma^2 \quad (2)$$

where E is the mean statistical operation performed on the quantity $(y_t - a_t)^2$, h is the vector of the pulse response to the transmission channel with superscript (T) indicating the matrix transposition of vectors c and h, $\sigma$ is the variance of the incoming symbols, and A is a covariance matrix of dimensions N×N which takes into account the pulse response of the channel, the variance of the thermal channel noise and the variance of the quantization noise produced by converter AD.

A generic element of matrix A, in position f,g, is given by $$A_{f,g} = \sigma^2 \cdot \sum_{k=1}^{N} h_{k-f} \cdot h_{k-g} + \sigma_R^2 + \sigma_Q^2 \quad (3)$$

where $\sigma_R$ is the thermal-noise variance and $\sigma_Q$ is the quantization-noise variance.

The mean square error can be rewritten as a function of each individual filter coefficient $c_i$, with all other coefficients kept constant, according to the expression $$\epsilon(c_i) = B \cdot c_i^2 + 2D \cdot c_i + F \quad (4)$$

where B, D and F are constants depending on the remaining (N−1) coefficients, on the corresponding pulse-response samples h and on the aforementioned variances $\sigma$ and $\sigma_R$. Thus, they are given by $$B = \sum_{k=1}^{N} h_{k-i}^2 \cdot \frac{\sigma_R^2}{\sigma^2} \quad (5)$$

$$D = \sum_{k=1}^{N} \cdot \sum_{\substack{j=1 \\ j \neq i}}^{N} c_j \cdot h_{k-i} \cdot h_{k-j} - h_{-i} \quad (6)$$

$$F = \sum_{k=1}^{N} \cdot \sum_{\substack{j=1 \\ j \neq i}}^{N} \cdot \sum_{p=1}^{N} c_j \cdot c_p \cdot h_{k-j} \cdot h_{k-p} + \quad (7)$$

$$1 - 2 \sum_{\substack{j=1 \\ j \neq i}}^{N} c_j \cdot h_{-j} + \frac{\sigma_R^2}{\sigma^2} \sum_{\substack{j=1 \\ j \neq i}}^{N} c_j^2$$

From equation (4) it will be noted that the individual mean square error $\epsilon(c_i)$ is a parabolic function of coefficient $c_i$ whose optimum value $\overline{c_i}$ is given by the abscissa of the vertex of the parabola. Thus, as already noted above, the parabola can be plotted in a coordinate system in which coefficient $c_i$ and its collateral values $c_i'$, $c_i''$ are plotted as abscissae and the associated mean square errors $\epsilon_i$, $\epsilon_i'$, $\epsilon_i''$ are the ordinates, thus yielding three points $P_i$, $P_i'$, $P_i''$ uniquely defining that parabola.

The method according to our invention does not utilize equations (2) through (7) but relies on equation (1) which is performed in processor UC, establishing $c_i' = c_i - \alpha$ and $c_i'' = c_i + \beta$ on the basis of the data fed in on leads 7 and 8. Errors $\epsilon_i$, $\epsilon_i'$ and $\epsilon_i''$ are computed in calculator ME on the basis of the output signals of simulator SE and thus without actual consideration of the value $(y_t - a_t)^2$ appearing in equation (2).

Figure 4:
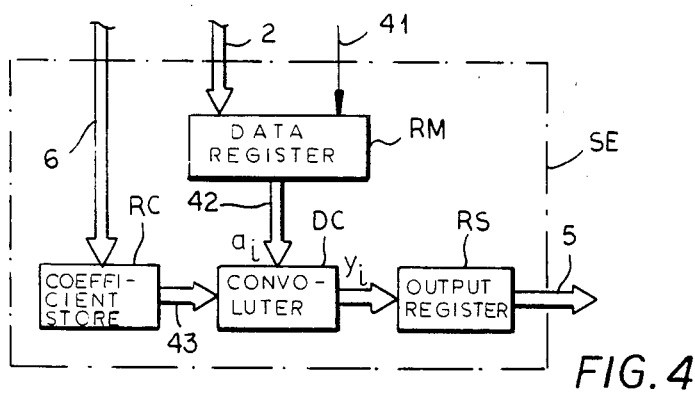
FIG. 4 is a more detailed showing of a filter simulator included in the computer of FIG. 3.

As shown in FIG. 4 filter simulator SE includes a data register RM for the collection of a block of incoming samples—specifically 150 of them in the present instance—arriving over bus 2, another register RC storing a complete set of N filter coefficients received from processor UC by way of bus 6, a convoluter DC having inputs connected via respective line multiples 42 and 43 with registers RM and RC, and an output register RS inserted between convoluter DC and line 5 extending to the error calculator ME of FIG. 3. The storage of 150 samples in register RM is controlled by processor UC via lead 41, further accumulation being inhibited while simulator SE operates on the contents of that register.

Samples fed to convoluter DC for the evaluation of a selected coefficient $c_i$ are denoted by $a_i$ while the corresponding output signals are designated $y_i$. The latter, when supplied to calculator ME after interim storage in register RS, are subjected to an upgrading operation similar to that carried out by decision stage CD (FIG.

1), resulting in a decided value $\hat{a}_i$ used in determining the corresponding mean square error $\epsilon_i$ given by $$\epsilon_i = \epsilon_{i-1} \cdot \frac{i-1}{i} + \frac{(\nu_i - \hat{a}_i)^2}{i} \quad (8)$$

The convolution carried out in circuit DC at the $q^{th}$ instant on a given sample $r_q$, extracted from register RM, produces an output signal C(q) given by $$C(q) = \sum_{k=1}^{N} c_k \cdot r_{q-k} \quad (9)$$

This operation is repeated for the entire block of samples contained in register RM. As each convoluting operation involves multiplications by N coefficients, the number q is counted from N+1 to N+150 for the entire block. Since each coefficient stored in register RC is a power of 2, these multiplications can again be carried out by simple shifting as described with reference to FIG. 2.

Let us now consider the entire sequence of operations performed in computer PA under the control of its processor UC with respect to a block of 150 samples received by register RM. An initial set of coefficients $c_1$-$c_N$ stored in register RC is convoluted with these samples and, when the process is completed, the result is delivered to calculator ME establishing the mean square error $\epsilon_1$ according to equation (8). This error is supplied on bus 9 to processor UC which, selecting the first coefficient $c_1$ of the stored initial set, successively establishes the two correlated values of $c_1'=c_1-\alpha$ and $c_1''=c_1+\beta$. With value $c_1'$ substituted for coefficient $c_1$ in register RC, the previous procedures are repeated to provide the correlated error $\epsilon_1'$ fed to processor UC. Analogously, an error $\epsilon_1''$ is obtained upon substitution of value $c_1''$ for value $c_1'$. The processor UC now has enough data to find the optimized coefficient $\overline{c_1}$ which is rounded to the nearest power of 2, constituting a new coefficient $c_{1a}$. After insertion of the latter coefficient in the position formerly occupied in register RC by coefficient $c_1$, the same operations are repeated for each of the remaining coefficients so as to yield, eventually, an updated set of coefficients $c_{1a}$-$c_{Na}$ from which calculator ME derives a new mean square error $\epsilon_{1a}$. If the processor finds this new error to be less than the original mean square error $\epsilon_1$ calculated for the initial set, it feeds the exponents of the new coefficients via connection 3 to filter EQ for stepping its shift registers CSR1-CSRN as previously described with reference to FIG. 2.

If, on the other hand, the new mean square error is not less than the original one, the initial set of coefficients $c_1$-$c_N$ is re-entered in register RC. In any case, register RM is now discharged preparatorily to receiving a new block of samples.

Our improved equalizer can track the typical variations occurring in microwave radio channels in which selected fadings generally have rates of amplitude changes not exceeding 100 dB/sec.

With a transmission rate of, say, 35 Mbaud, corresponding to a symbol period of about 30 ns, the amplitude variation within a symbol period would be about 3 $\mu$dB in the worst instance. Thus, the time required for an amplitude change by some tenths of a decibel is sufficient for the transmission of some thousands of symbols, enabling the adaptation of the filter coefficients to be conveniently carried out in the manner here disclosed.

We claim:

1. A method of operating a baseband equalizer for the compensation of distortions undergone by binary signals transmitted at high rate over a radio link to a receiving station equipped with said equalizer, the latter including a transversal filter inserted between an analog/digital converter and a decision stage, said converter extracting digitized samples from respective symbols of the incoming signal flow, comprising the steps of:

(a) loading said transversal filter with an initial set of corrective coefficients represented by powers of 2;

(b) accumulating a predetermined multiplicity of consecutively extracted samples in a register;

(c) convoluting said multiplicity of extracted samples with said initial set of coefficients and calculating an original mean square error from the result of convolution;

(d) successively replacing a first coefficient of said initial set with two collateral values differing subtractively and additively therefrom by predetermined magnitudes;

(e) separately repeating step (c) with each of said collateral values included in said initial set, thereby obtaining two further mean square errors respectively correlated with said collateral values;

(f) determining the locations, in a two-dimensional coordinate system, of three points whose abscissae are said first coefficient and said collateral values and whose ordinates are the mean square errors respectively correlated therewith, said three points uniquely defining a parabola;

(g) locating the vertex of said parabola and determining the abscissa thereof as an optimized coefficient;

(h) rounding said optimized coefficient to the nearest power of 2 constituting a new coefficient;

(i) with said new coefficient substituted in said initial set for said first coefficient, repeating steps (c) through (h) with a second coefficient and proceeding in like manner for all other coefficients of said initial set to produce an updated set of coefficients;

(j) upon obtention of a new mean square error from said updated set which is less than said original mean square error obtained from said initial set, substituting the updated set for the initial set in said transversal filter; and (k) reiterating steps (b) through (e) with a new multiplicity of consecutively extracted samples.

2. The method defined in claim 1 wherein step (g) involves determining an optimized coefficient $\overline{c_i}$, derived from a given coefficient $c_i$, in accordance with the following formula:

$$\overline{c_i} = \frac{1}{2} \cdot \frac{c_i'^2(\epsilon_i'' - \epsilon_i) - c_i''^2(\epsilon_i' - \epsilon_i)}{c_i'(\epsilon_i'' - \epsilon_i) + c_i''(\epsilon_i' - \epsilon_i)}$$

where $c_i'$ and $c_i''$ are the associated collateral values, with $\epsilon_i$, $\epsilon_i'$ and $\epsilon_i''$ respectively representing the mean square errors calculated in steps (b) and (d) for sets containing $c_i$, $c_i'$ and $c_i''$.

3. In a receiver for binary signals transmitted at high rate over a radio link, including an analog/digital converter for extracting digitized samples from respective symbols contained in the incoming data flow, a decision stage downstream of said converter, and an equalizer comprising a transversal filter inserted between said converter and said decision stage, the improvement wherein said equalizer further comprises a coefficient computer connected to said converter in parallel with said transversal filter, said computer including:

a filter simulator provided with first register means for accumulating a predetermined multiplicity of consecutive samples from said converter, second register means for storing a set of corrective coefficients usable in said transversal filter, and convoluting means for multiplying the stored coefficients with the accumulated samples;

an error calculator connected to said filter simulator for receiving the products of multiplication emitted by said convoluting means and determining therefrom a mean square error; and processing means connected to said filter simulator and to said error calculator for obtaining mean square errors determined by the latter, subtracting and adding predetermined magnitudes from and to a given coefficient $c_i$ stored in said second register means for establishing two collateral values $c_i'$, $c_i''$ sequentially substituted for said given coefficient in said second register means preparatorily to generation of other mean square errors $\epsilon_i'$, $\epsilon_i''$ respectively correlated with said collateral values, said processing means being further adapted to derive from a mean square error $\epsilon_i$ pertaining to said given coefficient $c_i$ and from said correlated errors $\epsilon_i'$, $\epsilon_i''$ an optimized coefficient $\bar{c_i}$ in accordance with the following formula:

$$\bar{c_i} = \frac{1}{2} \cdot \frac{c_i'^2(\epsilon_i'' - \epsilon_i) - c_i''^2(\epsilon_i' - \epsilon_i)}{c_i'(\epsilon_i'' - \epsilon_i) + c_i''(\epsilon_i' - \epsilon_i)}$$

and to round said optimized coefficient to the nearest power of 2 constituting a new coefficient to be substituted for said given coefficient $c_i$ in said second register means whereby, upon repetition of the same procedure with all coefficients of an initial set stored in said second register means, said initial set is replaced by an updated set giving rise to a new mean square error compared by said processing means with an original mean square error obtained from said initial set by said error calculator, said processing means having an output connection extending to said transversal filter for loading same with said updated set of coefficients upon finding said new mean square error to be less than said original mean square error.

4. An equalizer as defined in claim 3 wherein said transversal filter comprises a delay line consisting of a group of (n−1) first shift registers of (N−1) stages each where n is the number of bits of a digitized sample and N is the number of coefficients in a set, a group of N second shift registers connected to receive undelayed and delayed samples from said converter and from respective stage outputs of said first shift registers, said second shift registers being steppable by respective commands from said processing means representing the exponents of the powers of 2 of an updated set of coefficients to be loaded into said transversal filter, and a binary adder connected to the shift registers of said second group for receiving the shifted contents thereof.

* * * * *